April 9, 1963 E. JAKUBOWICS 3,085,202

SYNTHESIZATION OF CRYSTAL-CONTROLLED FREQUENCIES

Filed June 2, 1959 3 Sheets-Sheet 1

INVENTOR,
EDWARD JAKUBOWICS.

BY Harry M. Saragovitz

ATTORNEY.

INVENTOR,
EDWARD JAKUBOWICS.
BY Harry M. Saragovitz
ATTORNEY.

FIG. 6a, FIG. 6b
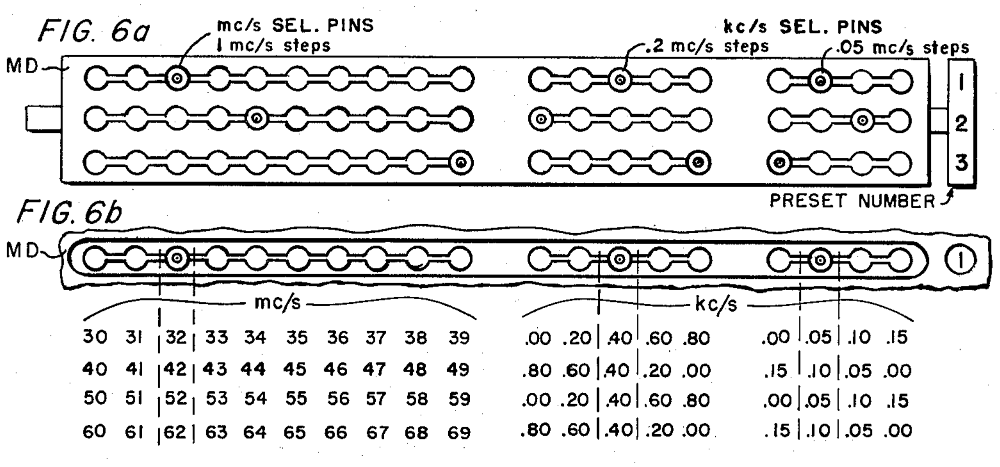
FIG. 7b
| mc/s | | | | | | | | | | kc/s | | | | | | | | |
|---|---|---|---|---|---|---|---|---|---|---|---|---|---|---|---|---|---|---|
| 30 | 31 | 32 | 33 | 34 | 35 | 36 | 37 | 38 | 39 | .00 | .20 | .40 | .60 | .80 | .00 | .05 | .10 | .15 |
| 40 | 41 | 42 | 43 | 44 | 45 | 46 | 47 | 48 | 49 | .80 | .60 | .40 | .20 | .00 | .00 | .05 | .10 | .15 |
| 50 | 51 | 52 | 53 | 54 | 55 | 56 | 57 | 58 | 59 | .00 | .20 | .40 | .60 | .80 | .15 | .10 | .05 | .00 |
| 60 | 61 | 62 | 63 | 64 | 65 | 66 | 67 | 68 | 69 | .80 | .60 | .40 | .20 | .00 | .15 | .10 | .05 | .00 |
FIG. 7a
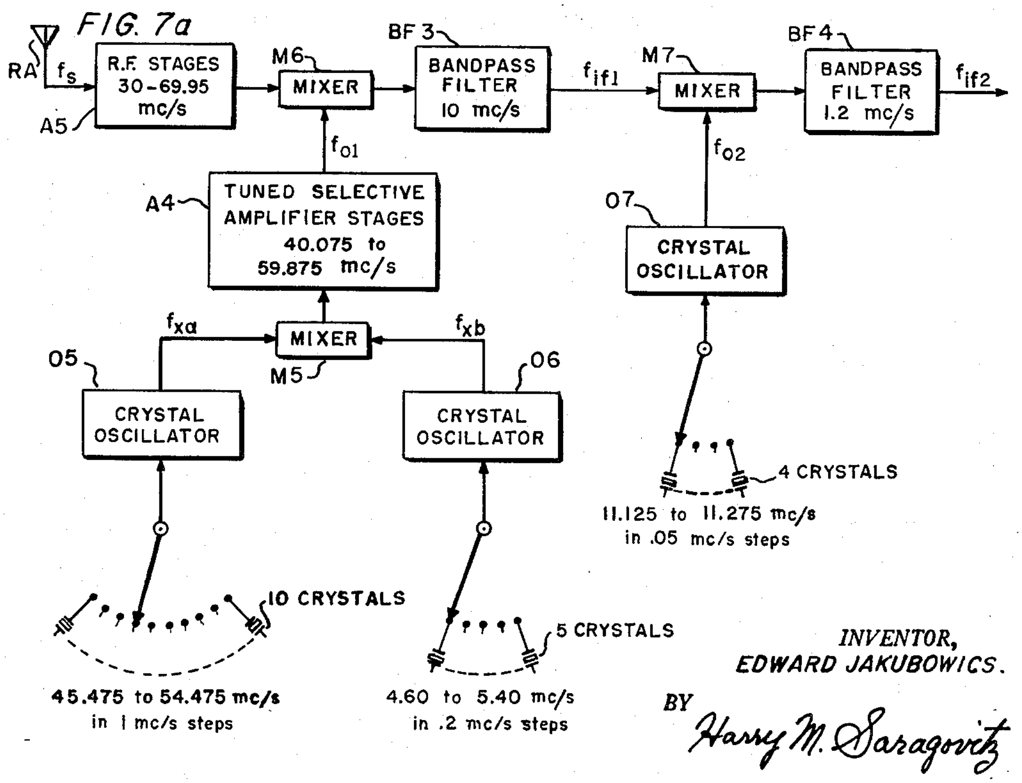
INVENTOR,
EDWARD JAKUBOWICS.
BY Harry M. Saragovitz
ATTORNEY United States Patent Office 3,085,202

Patented Apr. 9, 1963

3,085,202

SYNTHESIZATION OF CRYSTAL-CONTROLLED FREQUENCIES

Edward Jakubowics, Fairhaven, N.J., assignor to the United States of America as represented by the Secretary of the Army Filed June 2, 1959, Ser. No. 817,685
2 Claims. (Cl. 325—25)
(Granted under Title 35, U.S. Code (1952), sec. 266)

Figure 1:
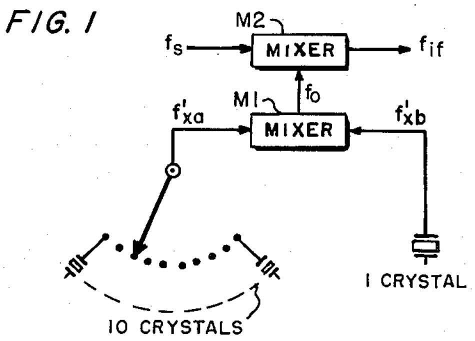

The invention described herein may be manufactured and used by or for the Government for governmental purposes, without the payment of any royalty thereon.

The invention relates to the generation of stable electric waves of different frequencies and particularly to the generation of waves of accurate crystal-derived frequencies by the process of synthesis.

The invention is especially adapted for, although not limited to, use with the receiving and transmitting equipment of an ultra-portable, broad-band, multichannel radio communication system utilizing piezoelectric crystals for frequency control, in which economy of crystals, small size and weight of the equipment and ease of channel frequency selection are of prime importance. It is possible to generate a large number of crystal-controlled frequencies by combining $n$ groups of crystal oscillator frequencies with $X_1, X_2, \ldots, X_n$ crystals in each group, in successive mixer stages. A mixer or mixer stage may be defined as a device, used in a signal transmission system, having two or more inputs, usually adjustable, and a common output, which operates to combine linearly in a desired proportion separate signals applied to the inputs to produce a signal in the common output of intermediate value. A special application is a stage in a superheterodyne receiver in which incoming modulated radio frequency signals are mixed with the local oscillator signal to produce the intermediate frequency signal. Also, by utilizing only sum (or difference) frequency outputs the number N of crystal-controlled frequencies which can be synthesized is the product $N=X_1X_2 \ldots X_n$. By utilizing both sum and difference outputs the number of output frequencies from each mixer is doubled and with $n$ mixer stages would be increased by the factor $2^n$.

A general object of the invention is to improve such systems of frequency synthesis from the standpoint of providing economy of crystals, reducing the size and weight of the system and making channel selection easy.

A more specific object is to produce a predetermined large number of stable, crystal-controlled frequencies by the process of synthesis utilizing a relatively small number of control crystals and simple circuitory such as to allow frequency selection processes to be simplified.

Another related object is to reduce the number of control crystals required to produce a given number of crystal-controlled channel frequencies for use in a multichannel radio communication system.

Another object is to reduce the number of crystals required to be stocked to provide complete frequency coverage in the manufacture of radio or other high frequency multichannel carrier communication systems for operation in given frequency ranges.

These objects are attained in accordance with the invention by circuit arrangements employing a plurality of mixer processes to produce particular combinations of discrete crystal-derived frequencies, in which sum and difference frequency mixing is utilized to obtain a total of N frequencies with a fourfold reduction of the mixer product; namely, $$X_1X_2 \ldots X_n=\frac{N}{4}$$

These arrangements make it possible to synthesize the required number of crystal-controlled frequencies for use in the transmitting and receiving equipments of radio or other high frequency carrier communication systems in a simple manner with one less frequency mixer stage than used in previous arrangements employing the same number of control crystals. The elimination of one mixer stage is particularly significant in ultra-portable radio sets for the following reasons:

(1) It eliminates the filtering which ordinarily would be required with this mixer stage to select the desired frequency output; and (2) For a fixed number of filter circuits, it reduces the spurious responses of the receiver and the spurious outputs of the transmitter which are a function of the number of mixers used.

A feature of the invention is the use of a combination of high and low side mixer outputs in cascade to provide synthesis of crystal-controlled frequencies with economy of control crystals, simple circuitry and ease of frequency selection.

Figure 2:
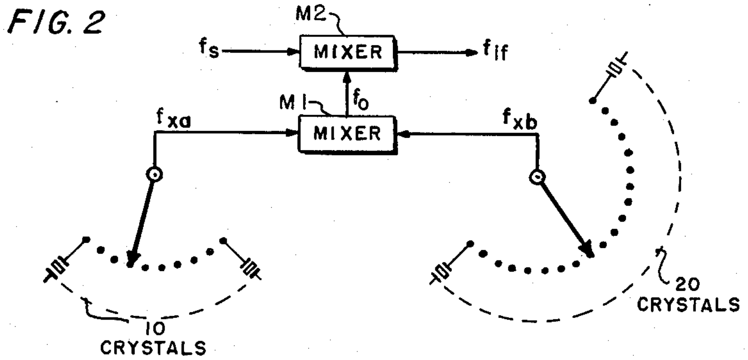
Figure 3:
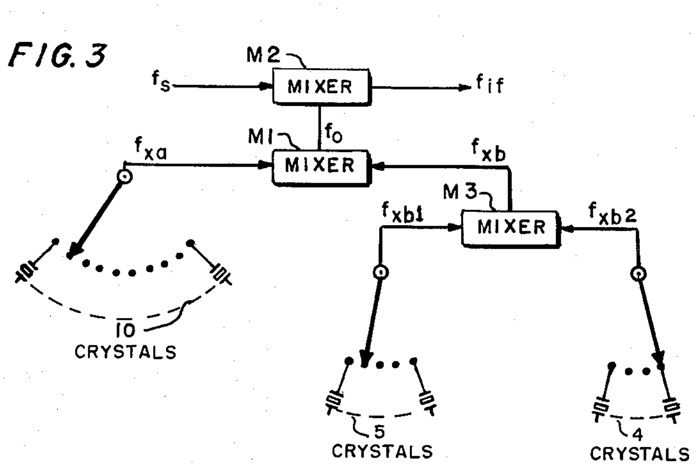
Figure 4:
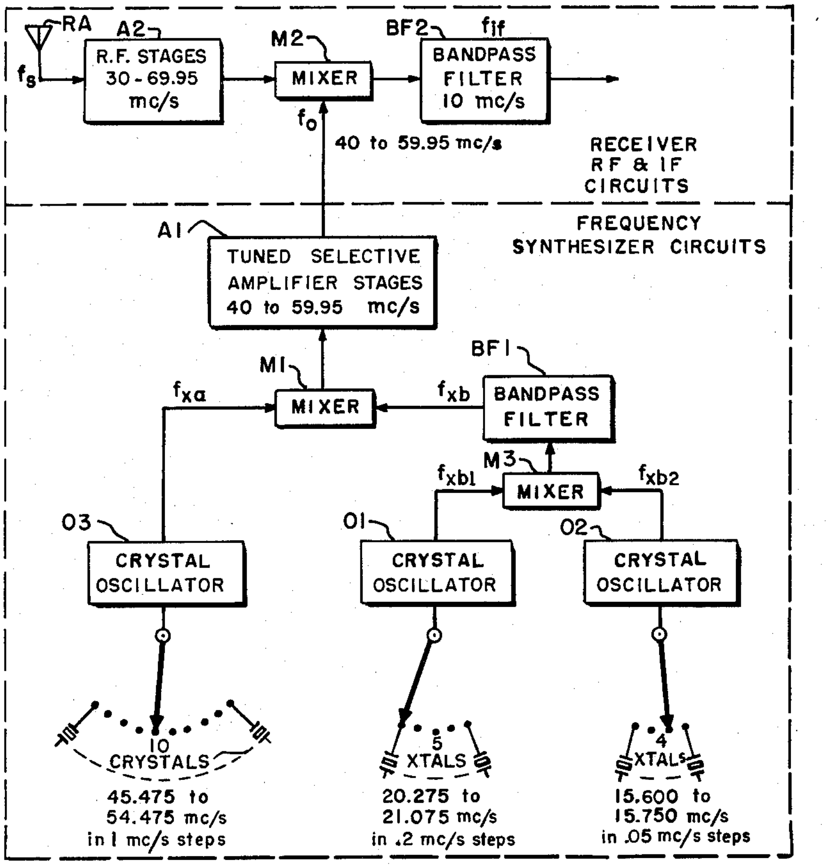
Figure 5:
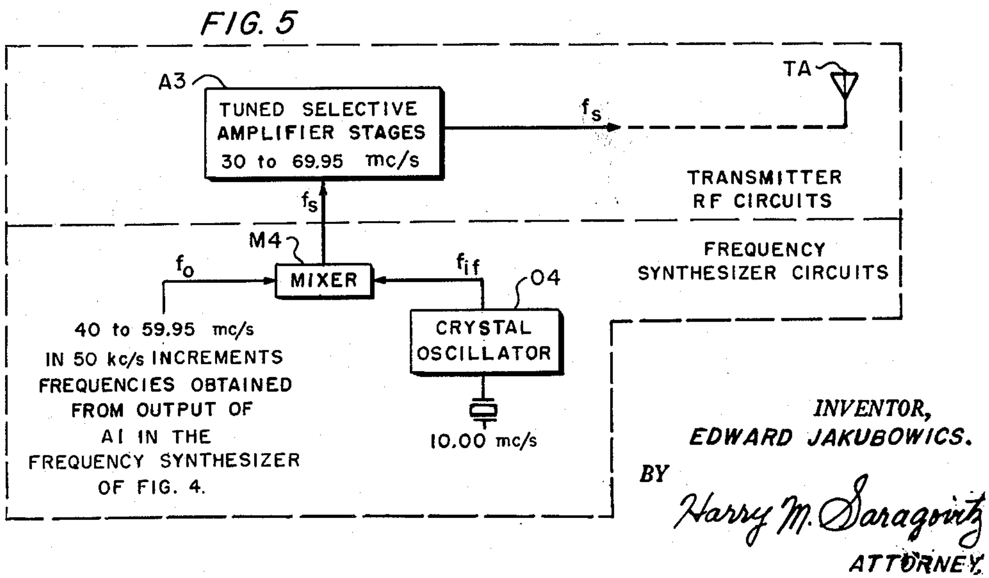

The various objects and features of the invention will be better understood from the following detailed description thereof when it is read in conjunction with the several figures of the accompanying drawings in which:

FIGS. 1 to 3 respectively show simplified diagrammatic representation of different frequency synthesizing arrangements in accordance with the invention;

FIGS. 4 and 5 respectively show in block diagrammatic form complete systems in accordance with the invention of synthesizing a plurality of different crystal-controlled frequencies, applied to the receiving and transmitting equipment, respectively, of a multichannel radio communication system.

FIGS. 6(*a*) and (*b*) respectively show how a selection of a particular combination of tuning crystals for a system of synthesis in accordance with the invention can be accomplished with the use of a conventional drum type selector; and a frequency presentation chart indicating the various combinations of the frequencies of the control tuning crystals which may be used for making the selection; and FIGS. 7(*a*) and (*b*) respectively show in block diagrammatic form a circuit arrangement in accordance with the invention for synthesizing a plurality of crystal-controlled frequencies for reception applied to a double conversion type of radio receiver; and a frequency presentation chart for indicating possible combinations of crystal frequencies which could be used in this circuit arrangement.

A numerical example will now be given of a method in accordance with the invention for synthesizing a number of crystal-controlled frequencies in a given frequency range $f_1$ to $f_2$ (30–70 mc./s.) in given tuning increments, say, 50 kc./s. ($N=800$ channels).

For superheterodyne radio reception utilizing high and low side frequency mixing, the first intermediate frequency (IF) $f_{if}$ is given by $$\frac{\Delta f}{4}=\frac{f_2-f_1}{4}=f_{if}\left(\frac{70-30}{4}=10 \text{ mc./s.}\right) \quad (1)$$

To provide 1 mc. tuning increments, the crystal-controlled local oscillator injection frequency ($f_0$) must provide frequencies in the range of 40–60 mc./s. in 1 mc. steps. Thus, for radio signals ($f_s$) in the range of 30–50 mc./s., the IF frequency is $f_{if}=f_0-f_s$ (40—30=10 mc./s); and for radio signals in the range 50–70 mc./s. is $$f_s-f_0=f_{if}$$

(50—40=10 mc./s). That this arrangement of high side and low side mixing is equivalent to sum and difference frequency mixing becomes apparent upon considering how the transmitter frequencies would be obtained: $f_s(\text{transmitting})=f_0 \pm f_{if}$.

If a frequency range of 40–60 mc./s. is in turn obtained by frequency combinations comprising sum and difference mixer frequency outputs (i.e., in cascade), the following relations apply:

For the range of $f_0$ from 40–50 mc./s.

$$f_0=f'_{xa}-f'_{xb} \quad (2)$$

and for the range of $f_0$ from 50–60 mc./s.

$$f_0=f'_{xa}+f'_{xb}$$

where $$f'_{xb}=\frac{\Delta f_0}{4}\left(\frac{60-40}{4}=5 \text{ mc./s.}\right) \quad (3)$$

Thus, the range of crystals in the group $f'_{xa}$ is from 45–54 mc./s. in 1 mc./s. increments and is combined in a mixer with a crystal oscillator frequency $f'_{xb}$.

In the frequency synthesis arrangement in accordance with the invention illustrated diagrammatically in FIG. 1, two frequency mixers M1 and M2 are employed to provide a cascade arrangement of sum and difference frequency outputs, where $f'_{xa}$ (the frequency of any one of 10 crystals providing different frequencies) applied to one input of the mixer M1 is combined in that mixer with $f'_{xb}$ (the frequency of 1 crystal) applied to the second input thereof to produce combination frequencies $f_0$ in its output circuit; and $f_0$ (the frequency output of M1 including both sum and difference frequency products) applied to one input of mixer M2 is combined in that mixer with the radio frequency $f_s$ applied to the second input of the mixer to produce in its output the intermediate frequency $f_{if}$. The following table illustrates the coverage of the frequency range 30–70 mc./s. in 1 mc./s. increments by this arrangement (all frequencies in this and the following tables being given in mc./s.).

| $f_s$ | $f_0$ | $f'_{ax}$ | $f'_{xb}$ | $f_{if}(f_0-f_s)$ |
|---|---|---|---|---|
| 30 | 40 | 45 | −5 | 10 |
| 31 | 41 | 46 | −5 | 10 |
| 39 | 49 | 54 | −5 | 10 |
| 40 | 50 | 45 | +5 | 10 |
| 41 | 51 | 46 | +5 | 10 |
| 49 | 59 | 54 | +5 | 10 |
| 50 | 40 | 45 | −5 | −10 |
| 51 | 41 | 46 | −5 | −10 |
| 59 | 49 | 54 | −5 | −10 |
| 60 | 50 | 45 | +5 | −10 |
| 61 | 51 | 46 | +5 | −10 |
| 69 | 59 | 54 | +5 | −10 |

In a modification of this synthesis system illustrated in FIG. 2, the 50 kc./s. tuning increments in range of 40–60 mc./s. (40.00, 40.05, . . . , 40.95) can be obtained by selecting any frequency $f_{xb}$ in a group of frequencies (provided by a group of 20 different crystals) for application to one input of the mixer M1 and combining that frequency in that mixer with a selected frequency $f_{xa}$ in a group of frequencies (provided by a group of 10 different crystals) applied to the second input thereof to produce the combination frequencies $f_0$ including both sum and difference products in the output of mixer M1. The frequencies $f_0$ are applied to one input of mixer M2 to combine therein with the radio frequency $f_s$ applied to the second input thereof to produce the intermediate frequency $f_{if}$ in the output of mixer M2. The interpolation range of frequencies of $f_{xb}$ is $\Delta f_{xb}$=.95 mc./s. (e.g. .00, .05, .10 . . . .95 mc./s.). To provide the 50 kc./s. tuning increments, the previously given values are modified as follows:

$$f_{xa}=f'_{xa}+\frac{\Delta f_{xb}}{2}\left(45+\frac{.95}{2}=45.475 \text{ mc./s.}\right) \quad (4)$$

$$f_{xb}=f'_{xb}-\frac{\Delta f_{xb}}{2}=4.525 \text{ mc./s. (low frequency end of interpolation range)} \quad (5)$$

$$f_{xb}=f'_{xb}+\frac{\Delta f_{xb}}{2}=5.475 \text{ mc./s. (high frequency end of interpolating range)} \quad (6)$$

| $f_s$ | $f_0$ | $f_{xa}$ | $f_{xb}$ | $f_{if}(f_0-f_s)$ |
|---|---|---|---|---|
| 30.00 | 40.00 | 45.475 | −5.475 | 10 |
| 30.05 | 40.05 | 45.475 | −5.425 | 10 |
| 30.10 | 40.10 | 45.475 | −5.375 | 10 |
| 30.15 | 40.15 | 45.475 | −5.325 | 10 |
| 30.20 | 40.20 | 45.475 | −5.275 | 10 |
| 30.95 | 40.95 | 45.475 | −4.525 | 10 |
| 31.00 | 41.00 | 46.475 | −5.475 | 10 |
| 32.00 | 42.00 | 47.475 | −5.475 | 10 |
| 39.00 | 49.00 | 54.475 | −5.375 | 10 |
| 39.95 | 49.95 | 54.475 | −4.525 | 10 |
| 40.00 | 50.00 | 45.475 | +4.525 | 10 |
| 40.05 | 50.05 | 45.475 | +4.575 | 10 |
| 41.00 | 51.00 | 46.475 | +4.525 | 10 |
| 42.00 | 52.00 | 47.475 | +4.525 | 10 |
| 49.00 | 59.00 | 54.475 | +4.525 | 10 |
| 49.95 | 59.95 | 54.475 | +5.475 | 10 |
| 50.00 | 40.00 | 45.475 | −5.475 | −10 |
| 50.05 | 40.05 | 45.475 | −5.425 | −10 |
| 51.00 | 41.00 | 46.475 | −5.475 | −10 |
| 52.00 | 42.00 | 47.475 | −5.475 | −10 |
| 59.00 | 49.00 | 54.475 | −5.475 | −10 |
| 59.95 | 49.95 | 54.475 | −4.525 | −10 |
| 60.00 | 50.00 | 45.475 | +4.525 | −10 |
| 60.05 | 50.05 | 45.475 | +4.575 | −10 |
| 61.00 | 51.00 | 46.475 | +4.525 | −10 |
| 62.00 | 52.00 | 47.475 | +4.525 | −10 |
| 69.00 | 59.00 | 54.475 | +4.525 | −10 |
| 69.95 | 59.95 | 54.475 | +5.475 | −10 |

In a preferred arrangement of this method of synthesis utilizing in addition to the mixers M1 and M2 a third mixer M3, illustrated in FIG. 3, the frequency $f_{xb}$ supplied to one input of mixer M1 to combine therein with the frequency $f_{xa}$ supplied to the second input thereof would be the sum and difference products in the output of the mixer M3 obtained by combining therein any frequency $f_{xb1}$ selected from a group of frequencies (supplied by a group of 5 different crystals) and applied to one input of the mixer M3 with the selected frequency $f_{xb2}$ (supplied by a group of 4 different crystals) applied to the second input of that mixer, that is, $f_{xb}=f_{xb1} \pm f_{xb2}$. For purposes of illustration, this might be carried out according to the scheme in the following table which does not necessarily represent the optimum choice of frequencies:

| $f_{xb}$ | $f_{xb1}$ | $f_{xb2}$ |
|---|---|---|
| 4.525 | 20.275 | 15.750 |
| 4.575 | 20.275 | 15.700 |
| 4.625 | 20.275 | 15.650 |
| 4.675 | 20.275 | 15.600 |
| 4.725 | 20.475 | 15.750 |
| 4.775 | 20.475 | 15.700 |
| 4.825 | 20.475 | 15.650 |
| 4.875 | 20.475 | 15.600 |
| 4.925 | 20.675 | 15.750 |
| 4.975 | 20.675 | 15.700 |
| 5.025 | 20.675 | 15.650 |
| 5.075 | 20.675 | 15.600 |
| 5.125 | 20.875 | 15.750 |
| 5.175 | 20.875 | 15.700 |
| 5.225 | 20.875 | 15.650 |
| 5.275 | 20.875 | 15.600 |
| 5.325 | 21.075 | 15.750 |
| 5.375 | 21.075 | 15.700 |
| 5.425 | 21.075 | 15.650 |
| 5.475 | 21.075 | 15.600 |

A radio receiver equipped with a complete frequency synthesis circuit in accordance with the invention of the general type illustrated diagramamtically in FIG. 3, for synthesizing a plurality of crystal-controlled frequencies within a given frequency range (30.00 to 69.95 mc./s.) in given tuning increments (50 kc./s.) is shown in FIG. 4. Referring to the latter figure, the selected frequency output $f_{xb1}$ of a crystal oscillator O1 which under control of the associated group of 5 different crystals is adapted for producing any one of five different frequencies in the range between 20.275 and 21.025 mc./s in .2 mc./s. steps, is combined in the mixer M3 with the selected frequency output $f_{xb2}$ of a crystal oscillator O2 which under control of the associated group of 4 crystals is adapted for producing any one of four different frequencies in the frequency range 15.750 to 15.600 mc./s. in .05 mc./s. steps. The desired one of the combination frequencies $f_{xb}$ including both sum and difference frequency products appearing in the output of mixer M3 is selected by the bandpass filter BF1 (4.525–5.475 mc./s.) and is supplied to one input of the mixer M1 to combine therein with the selected frequency output $f_{xa}$ of the crystal oscillator O3 which under control of the associated group of 10 crystals is adapted for producing any one of 10 different frequencies in the frequency range of 45.475 to 54.475 mc./s. in 1 mc./s. steps. The combination sum and difference frequency products $f_0$ within the frequency range 40 to 59.95 mc./s. appearing in the output of mixer M1, after amplification by the selective amplifier stages A1 tuned to pass the desired one of these frequencies, is applied to one input of the mixer M2 in which it is combined with the frequency $f_s$ applied to the second input of that mixer. The frequency $f_s$ is an amplified radio frequency within the frequency range 30–69.95 mc./s. appearing in the output of the RF amplifier stages A2 supplied with radio signals of these frequencies from the associated receiving antenna RA. The combination intermediate frequency $f_{if}$ of 10 mc./s. appearing in the output of M2 is selected by the bandpass filter BF2. As indicated, the receiver so described would thus require only 10+5+4=19 control crystals to provide reception on any one of 800 channels.

The block diagram of FIG. 5 illustrates how, in accordance with the invention, for transceiver operation, the addition of one other mixer and a single control crystal to the receiver of FIG. 4, transmission can be accomplished also on any one of 800 channels. As shown, one input of this additional mixer M4 is supplied with an intermediate frequency $f_{if}$ of 10 mc./s. produced by the crystal oscillator O4 under control of the associated 10.00 mc./s crystal, and the second input of mixer M4 is supplied with each of the frequencies $f_0$ comprising frequencies within the frequency range of 40 to 59.95 mc./s. in 50 kc./s. increments obtained from the output of the selective amplifier stages A1 in the frequency synthesizer of FIG. 4. The desired one of the combination sum and difference frequency products $f_s$ within the frequency range 30 to 69.95 mc./s. appearing in the output of mixer M4 after amplification by the tuned selective amplifier stages A3 will be supplied to the transmitting antenna TA for transmission.

The tuning crystals used for synthesis of a desired number of crystal-controlled frequencies in accordance with the invention in the radio set of FIGS. 4 and 5 form an integral part of that set. Selection of the proper combination of the frequencies produced under control of these crystals ($f_{xa}$, $f_{xb1}$, $f_{xb2}$) can be accomplished in a simple manner, such as by proper positioning of crystal selector pins on a conventional memory drum type selector unit MD such as illustrated diagrammatically in two views at the top of FIG. 6. The upper view, in FIG. 6(*a*), of this unit shows the positioning of several rows of selector pins corresponding to particular preset frequencies on the drum, and the lower view, in FIG. 6(*b*), of the unit illustrates a window of this drum with one row of selector pins exposed, in a positioning determined by a particular combination of preset frequencies taken from the frequency presentation chart of FIG. 6(*b*) showing different combinations of these frequencies which would be chosen to set up the crystal selector pins on the drum. For example, the selector pins labeled 1 mc./s., .2 mc./s. and .05 mc./s. would be positioned on the drum as shown to line up with the proper columns on the chart as indicated. Thus, depending on the tuning required in the associated circuitry, the selector pin positions would permit operation of the radio set on one of the following four frequencies (corresponding to the four rows of the chart in FIG. 6(*b*)): 32.45, 42.50, 52.45 and 62.50 mc./s.

An examination of this chart (FIG. 6(*b*)) should also clarify how, in the method of synthesis in accordance with the invention, the three groups of crystals can be used to obtain a fourfold increase in the number of crystal-controlled receiving (and transmitting) frequencies.

FIG. 7(*a*) is a block diagram of a system in accordance with the invention for synthesis of frequencies for reception in a double conversion type of radio receiving system with high-low side frequency mixing plus high-low first crystal oscillator injection and second crystal oscillator injection providing two interpolation steps, in the frequency range 30–69.95 mc./s. in 50 kc./s. increments. Referring to FIG. 7(*a*), the frequency output $f_{xa}$ of the crystal oscillator O5 under control of each of the 10 associated crystals in the frequency range of 45.475 to 54.475 mc./s. is combined in the mixer M5 with the output frequency $f_{xb}$ of the crystal oscillator O6 under control of each of the 5 associated crystals in the frequency range 4.60 to 5.40 mc./s. to produce sum and difference frequency products $f_{01}$ in the frequency range 40.075 to 59.875 mc./s. The frequencies $f_{01}$ with an amplification provided by the selective amplifier stages A4 tuned to pass any one of those frequency products are applied to one input of the mixer M6. The amplified radio frequencies $f_s$ in the frequency range 30–69.95 mc./s. in the output of the RF amplifier stages A5 fed from the receiving antenna RA are applied to a second input of the mixer M6 to combine therein with the frequency $f_{01}$ to produce the first intermediate frequency ($f_{if1}$=9.925, 9.975, 10.025 or 10.075 mc./s.) centered at 10 mc./s. which is selected by the bandpass filter $BF_3$. The frequency $f_{if1}$ is applied to one input of the mixer M7 to combine therein with the frequencies $f_{02}$ in the output of the crystal oscillator O7 produced under control of a selected one of the four associated crystals of frequencies within the frequency range 11.125 to 11.275 mc./s., which are applied to a second input of M7. The second intermediate frequency $f_{if2}$ of a frequency 1.2 mc./s. appearing in the output of mixer M7 is selected by the bandpass filter BF4. The complete frequency scheme for synthesis of frequencies for reception in a double conversion type of radio receiving system by this method (FIG. 7(*a*), 7(*b*)) to provide the frequency range of 30.00 to 69.95 mc./s. in 50 kc./s. increments is given in the following table:

| $f_s$ | $f_{01}$ | $f_{xa}$ | $f_{xb}$ | $f_{if1}$ | $f_{02}$ | $f_{if2}$ |
|---|---|---|---|---|---|---|
| 30.00 | 40.075 | 45.475 | −5.4 | 10.075 | 11.275 | 1.2 |
| 30.05 | 40.075 | 45.475 | −5.4 | 10.025 | 11.225 | 1.2 |
| 30.10 | 40.075 | 45.475 | −5.4 | 9.975 | 11.175 | 1.2 |
| 30.15 | 40.075 | 45.475 | −5.4 | 9.925 | 11.125 | 1.2 |
| 30.20 | 40.275 | 45.475 | −5.2 | 10.075 | 11.275 | 1.2 |
| 30.40 | 40.475 | 45.475 | −5.0 | 10.075 | 11.275 | 1.2 |
| 30.60 | 40.675 | 45.475 | −4.8 | 10.075 | 11.275 | 1.2 |
| 30.80 | 40.875 | 45.475 | −4.6 | 10.075 | 11.275 | 1.2 |
| 31.00 | 41.075 | 46.475 | −5.4 | 10.075 | 11.275 | 1.2 |
| 39.00 | 49.075 | 54.475 | −5.4 | 10.075 | 11.275 | 1.2 |
| 40.00 | 50.075 | 45.475 | +4.6 | 10.075 | 11.275 | 1.2 |
| 40.20 | 50.275 | 45.475 | +4.8 | 10.075 | 11.275 | 1.2 |
| 40.40 | 50.475 | 45.475 | +5.0 | 10.075 | 11.275 | 1.2 |
| 40.60 | 50.675 | 45.475 | +5.2 | 10.075 | 11.275 | 1.2 |
| 40.80 | 50.875 | 45.475 | +5.4 | 10.075 | 11.275 | 1.2 |
| 49.00 | 59.075 | 54.475 | +4.6 | 10.075 | 11.275 | 1.2 |
| 50.00 | 40.075 | 45.475 | −5.4 | 9.925 | 11.125 | 1.2 |
| 50.05 | 40.075 | 45.475 | −5.4 | 9.975 | 11.175 | 1.2 |
| 50.10 | 40.075 | 45.475 | −5.4 | 10.025 | 11.225 | 1.2 |
| 50.15 | 40.075 | 45.475 | −5.4 | 10.075 | 11.275 | 1.2 |
| 50.20 | 40.275 | 45.475 | −5.2 | 9.925 | 11.125 | 1.2 |
| 50.40 | 40.475 | 45.475 | −5.0 | 9.925 | 11.125 | 1.2 |
| 50.60 | 40.675 | 45.475 | −4.8 | 9.925 | 11.125 | 1.2 |
| 50.80 | 40.875 | 45.475 | −4.6 | 9.925 | 11.125 | 1.2 |
| 51.00 | 41.075 | 46.475 | −5.4 | 9.925 | 11.125 | 1.2 |
| 59.00 | 49.075 | 54.475 | −5.4 | 9.925 | 11.125 | 1.2 |
| 60.00 | 50.075 | 45.475 | +4.6 | 9.925 | 11.125 | 1.2 |
| 60.20 | 50.275 | 45.475 | +4.8 | 9.925 | 11.125 | 1.2 |
| 60.40 | 50.475 | 45.475 | +5.0 | 9.925 | 11.125 | 1.2 |
| 60.60 | 50.675 | 45.475 | +5.2 | 9.925 | 11.125 | 1.2 |
| 60.80 | 50.875 | 45.475 | +5.4 | 9.925 | 11.125 | 1.2 |
| 69.00 | 59.075 | 54.475 | +4.6 | 9.925 | 11.125 | 1.2 |
| 69.95 | 59.875 | 54.475 | +5.4 | 10.075 | 11.275 | 1.2 |

The frequency presentation chart of FIG. 7(*b*) shows in the several rows various combinations of frequencies of the control crystals which may be used in the radio receiver shown in FIG. 7(*a*).

Various modifications of the frequency synthesizing systems illustrated in the several figures of the drawings and described above which are within the spirit and scope of the invention will occur to persons skilled in the art.

What is claimed is:

1. In combination with a multichannel carrier signal communication system including a source of received communication signals in a given frequency range associated with the receiver thereof, a frequency synthesizing system comprising a plurality of crystals of different selected frequency values, a plurality of oscillators each controlled by a selected crystal in a different group of one or more of said control crystals to produce a control wave of a different frequency within a selected different frequency range, three frequency mixers each having two inputs and one output, means for respectively applying the control wave outputs of certain ones of said oscillators to different inputs of a first one of said mixers, means for selecting one of the sum and difference frequency components of the applied control frequencies appearing in the output of said first mixer, means for applying the resulting component to one of the inputs of a second mixer and for applying the control wave output of a third oscillator to the second input thereof, frequency selecting means for selecting one of the sum and difference components of the applied control frequencies appearing in the output of said second mixer and for applying the selected component to one input of a third mixer, means for applying the received signals within said given frequency range from said source to the second input of said third mixer to combine therein with the selected component applied to said one input thereof, means for selecting an intermediate frequency component appearing in the output of said third mixer, a signal transmitter, a fourth oscillator having an associated control crystal for producing another control wave of corresponding frequency, a fourth frequency mixer having two inputs and one output, means for respectively applying the control wave output of said fourth oscillator and the selected sum and difference frequency output of said second mixer to different inputs of said fourth mixer to combine in that mixer to produce in its output sum and difference components of the frequencies of the applied waves and means for selectively amplifying the resulting frequency components and for applying them to said signal transmitter to translate the outgoing signals to the proper frequencies for transmission.

2. In combination with a multichannel carrier signal communication system including a source of received communication signals in a given frequency range associated with the receiver thereof, a frequency synthesizing system comprising a plurality of crystals of different selected frequency values, a plurality of oscillators each controlled by a selected crystal in a different group of one or more of said control crystals to produce a control wave of a different frequency within a selected different frequency range, three frequency mixers each having two inputs and one output, means for respectively applying the control wave outputs of certain ones of said oscillators to different inputs of a first one of said mixers, means for selecting one of the sum and difference frequency components of the applied control frequencies appearing in the output of said first mixer, means for applying the resulting component to one of the inputs of a second mixer and for applying the control wave output of a third oscillator to the second input thereof, frequency selecting means for selecting one of the sum and difference components of the applied control frequencies appearing in the output of said second mixer and for applying the selected component to one input of a third mixer, means for applying the received signals within said given frequency range to the second input of said third mixer to combine therein with the selected component applied to said one input thereof, means for selecting an intermediate frequency component appearing in the output of said third mixer, a fourth crystal oscillator with associated crystals of different frequencies within a selected frequency range for producing a control wave output of corresponding frequencies, a fourth frequency mixer having two inputs and one output, means for respectively applying the control wave outputs of said fourth oscillator and the selected intermediate frequency components in the output of said third mixer to different ones of the two inputs of said fourth mixer to combine therein to produce sum and difference frequency components of the frequencies of the applied waves and filtering means for selecting a second intermediate frequency component from the output of said fourth mixer.

References Cited in the file of this patent

UNITED STATES PATENTS

| | | |
|---|---|---|
| 2,401,481 | Harnett | June 4, 1946 |
| 2,494,345 | Manke | Jan. 10, 1950 |
| 2,501,591 | Bach | Mar. 21, 1950 |
| 2,509,963 | Collins | May 30, 1950 |
| 2,567,860 | Sharpiro | Sept. 11, 1951 |
| 2,606,285 | Bataille et al. | Aug. 5, 1952 |
| 2,679,005 | Bataille et al. | May 18, 1954 |
| 2,756,331 | Foster et al. | July 24, 1956 |